United States Patent
Williams

(10) Patent No.: US 8,534,414 B2
(45) Date of Patent: Sep. 17, 2013

(54) STEERING APPARATUS FOR A VEHICLE HAVING FRONT AND REAR STEERABLE WHEELS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 1435 days.

(21) Appl. No.: 11/629,829

(22) PCT Filed: Jun. 10, 2004

(86) PCT No.: PCT/US2004/018534
§ 371 (c)(1),
(2), (4) Date: Aug. 15, 2008

(87) PCT Pub. No.: WO2005/009823
PCT Pub. Date: Feb. 3, 2005

(65) Prior Publication Data
US 2008/0289897 A1  Nov. 27, 2008

Related U.S. Application Data

(60) Provisional application No. 60/486,141, filed on Jul. 9, 2003.

(51) Int. Cl.
*B62D 5/00* (2006.01)

(52) U.S. Cl.
USPC .................................. 180/402; 180/410

(58) Field of Classification Search
USPC ................................... 180/402, 410
See application file for complete search history.

(56) References Cited

U.S. PATENT DOCUMENTS

| | | | | |
|---|---|---|---|---|
| 3,198,551 A | * | 8/1965 | Garner | 280/481 |
| 4,782,907 A | | 11/1988 | Morishita et al. | |
| 4,934,474 A | * | 6/1990 | Sugasawa | 180/414 |
| 6,131,691 A | | 10/2000 | Morch | |
| 6,561,308 B1 | * | 5/2003 | Carroll et al. | 180/446 |
| 2003/0183440 A1 | * | 10/2003 | Thomas et al. | 180/402 |

* cited by examiner

*Primary Examiner* — Tony Winner
*Assistant Examiner* — Jacob Knutson
(74) *Attorney, Agent, or Firm* — Tarolli, Sundheim, Covell & Tummino LLP

(57) ABSTRACT

An apparatus (10) for turning steerable wheels (28, 124) of a vehicle (12) in response to input to a driver control interface (14) includes a sensor (18) for monitoring steering input to the driver control interface (14) and for providing a steering input signal indicative of the monitored steering input. Front and rear steering systems (24, 110 and 120, 126) are actuatable for turning front and rear sets of steerable wheels (28, 124), respectively. A controller (22), upon a malfunction of the front steering-system (24, 110), actuates only the rear steering system (120, 126) in response to the steering input signal.

14 Claims, 7 Drawing Sheets

STEERING APPARATUS FOR A VEHICLE HAVING FRONT AND REAR STEERABLE WHEELS

RELATED APPLICATION

This application corresponds to PCT/US2004/018534, filed Jun. 10, 2004 which claims priority from U.S. Provisional Patent Application Ser. No. 60/486,141, filed Jul. 9, 2003, the subject matter of which are incorporated by reference in their entireties.

TECHNICAL FIELD

The present invention relates to a steering apparatus for turning the steerable wheels of a vehicle. More particularly, the present invention relates to a steering apparatus including a front steering gear for turning front steerable wheels of a vehicle and a rear steering gear for turning rear steerable wheels of the vehicle.

BACKGROUND OF THE INVENTION

Power steering gears are common in modern vehicles. Typically, one or more rigid shafts connect a vehicle steering wheel to an input shaft of the power steering gear. The rigid shafts must be routed from the vehicle steering wheel to the input shaft of the power steering gear. Routing the rigid shafts between the steering wheel and the steering gear is often difficult, as other vehicle components must not interfere with the shafts.

Some known vehicle steering systems have eliminated the rigid shafts. Such systems are commonly referred to as "steer-by-wire" systems. In some steer-by-wire systems, there is no mechanical connection between the steering wheel and the steering gear. An electronic system is provided that is responsive to operator-applied inputs to the steering wheel for controlling actuation of the steering gear. With no mechanical connection between the steering wheel and the steering gear, steering control of the vehicle is lost if the steer-by-wire system fails.

Other known vehicle steering systems enable multi-axle steering. A multi-axle steering system generally includes a front steering gear for turning front steerable wheels and a rear steering gear for turning rear steerable wheels. The rear steering gear is responsive to vehicle speed and to the steering angle of the front steerable wheels. When the vehicle speed is below a predetermined level and the steering angle of the front steerable wheels is greater than a predetermined amount, the rear steering gear is actuated for turning the rear steerable wheels. As a result, the rear steering gear turns the rear steerable wheels to supplement the steering provided by the front steering gear.

Caster causes a road wheel to align itself with the direction of vehicle travel. Caster provides returnability in conventional steering systems. Auxiliary axles of multi-axle vehicles commonly use caster to steer the wheels. Such "self steered" axles cannot generate a side force to help turn the vehicle.

SUMMARY OF THE INVENTION

The present invention relates to an apparatus for turning steerable wheels of a vehicle in response to input to a driver control interface. The apparatus comprises a sensor for monitoring steering the input to the driver control interface and for providing a steering input signal indicative thereof. A front steering system is actuatable for turning a front set of steerable wheels of the vehicle. A rear steering system is actuatable for turning a rear set of steerable wheels of the vehicle. A controller is responsive to the steering input signal for controlling actuation of the front and rear steering systems. The controller, upon a malfunction of the front steering system, actuates the rear steering system in response to the steering input signal.

In accordance with another aspect, the present invention relates to an apparatus comprising a driver control interface for turning steerable wheels of a vehicle. The apparatus also comprises at least three spaced apart axles including front and rear steering axles and an intermediate axle. A sensor monitors steering input to the driver control interface and provides a steering input signal indicative thereof. A front steering system is operatively connected to the front steering axle and is actuatable for turning a front set of steerable wheels. A rear steering system is operatively connected to a rear steering axle and is actuatable for turning a rear set of steerable wheels. A controller is responsive to the steering input signal for actuating the front and rear steering systems. The controller, upon a malfunction of one steering system, actuates the other steering system in response to the steering input signal.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
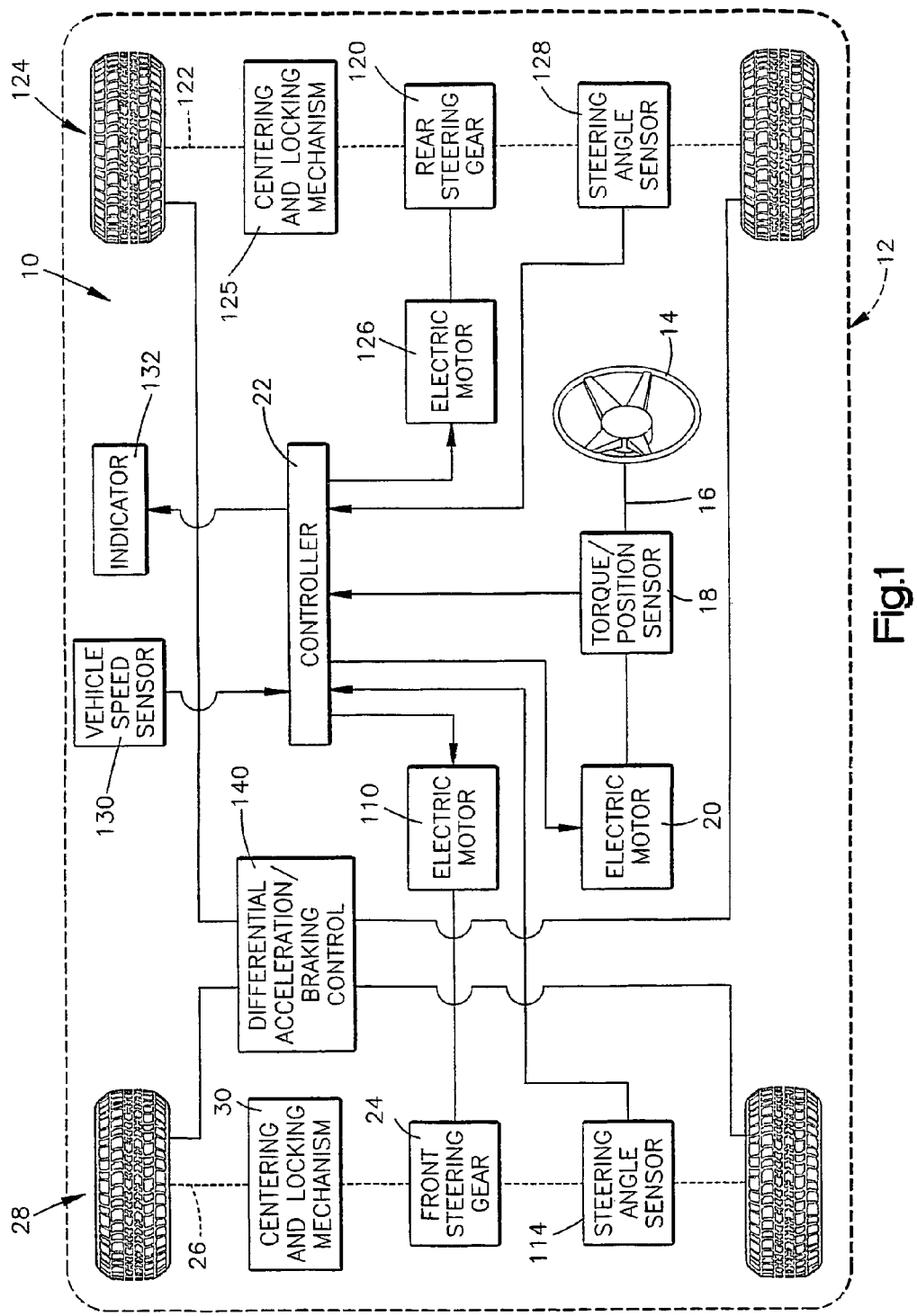
FIG. 1 is a schematic illustration of an apparatus constructed in accordance with the present invention.

FIG. 1 schematically illustrates a steering apparatus 10 constructed in accordance with the present invention. The steering apparatus 10 is mounted in a vehicle, illustrated schematically at 12. The steering apparatus 10 includes a steering wheel 14 or other driver control interface, such as a joystick. The steering wheel 14 is of a known construction and is manually rotatable by a vehicle operator. A shaft 16 is fixed to the center or hub of the steering wheel 14. Angular rotation of the steering wheel 14 results in an equivalent angular rotation of the shaft 16.

A torque/position sensor 18 is operable to sense operator applied torque and angular rotation of the steering wheel 14 and to provide steering input signals indicative of the applied torque and angular rotation of the steering wheel 14. The torque/position sensor 18 may be any known sensor or group of sensors for sensing applied torque and angular rotation of the steering wheel 14 and for providing steering input signals indicative of the sensed parameters.

An electric motor 20 is connected to the shaft 16. Preferably, a gear assembly (not shown) connects an output shaft of the electric motor 20 to the shaft 16. The electric motor 20 is actuatable to provide resistance to rotation of the steering wheel 14 and thus, is commonly referred to as a "steering feel motor."

The steering apparatus 10 also includes a controller 22. Preferably, the controller 22 is a microcomputer. The controller 22 is operatively connected to the torque/position sensor 18 and receives the steering input signals from the torque/position sensor 18. The controller 22 is also operatively connected to the electric motor 20. The controller 22 is responsive to the steering input signals from the torque/position sensor 18 for controlling actuation of the electric motor 20 for providing steering feel to the steering wheel 14. Although a steering wheel is the conventional structure for the driver to guide the vehicle, other driver control interfaces, such as a joystick, are possible.

The steering apparatus 10 also includes a front steering gear 24. The front steering gear 24 is operatively connected to a front steering axle 26 having a front set of steerable wheels 28. The front steering gear 24 is actuatable for moving the front steering axle 26 so as to turn the front set of steerable wheels 28. A centering and locking mechanism 30 is operatively connected to the front steering axle 26. The centering and locking mechanism 30 returns the front set of steerable wheels 28 to the straight ahead position and mechanically locks the front set of steerable wheels 28 in the straight-ahead position when the front steering gear 24 is not acting on the front steering axle 26. The centering and locking mechanism 30 may include any type of axle centering device and locking device. An exemplary centering device is described in U.S. Pat. No. 4,770,264 and an exemplary locking device is shown in U.S. Pat. No. 4,856,606.

Figure 2:
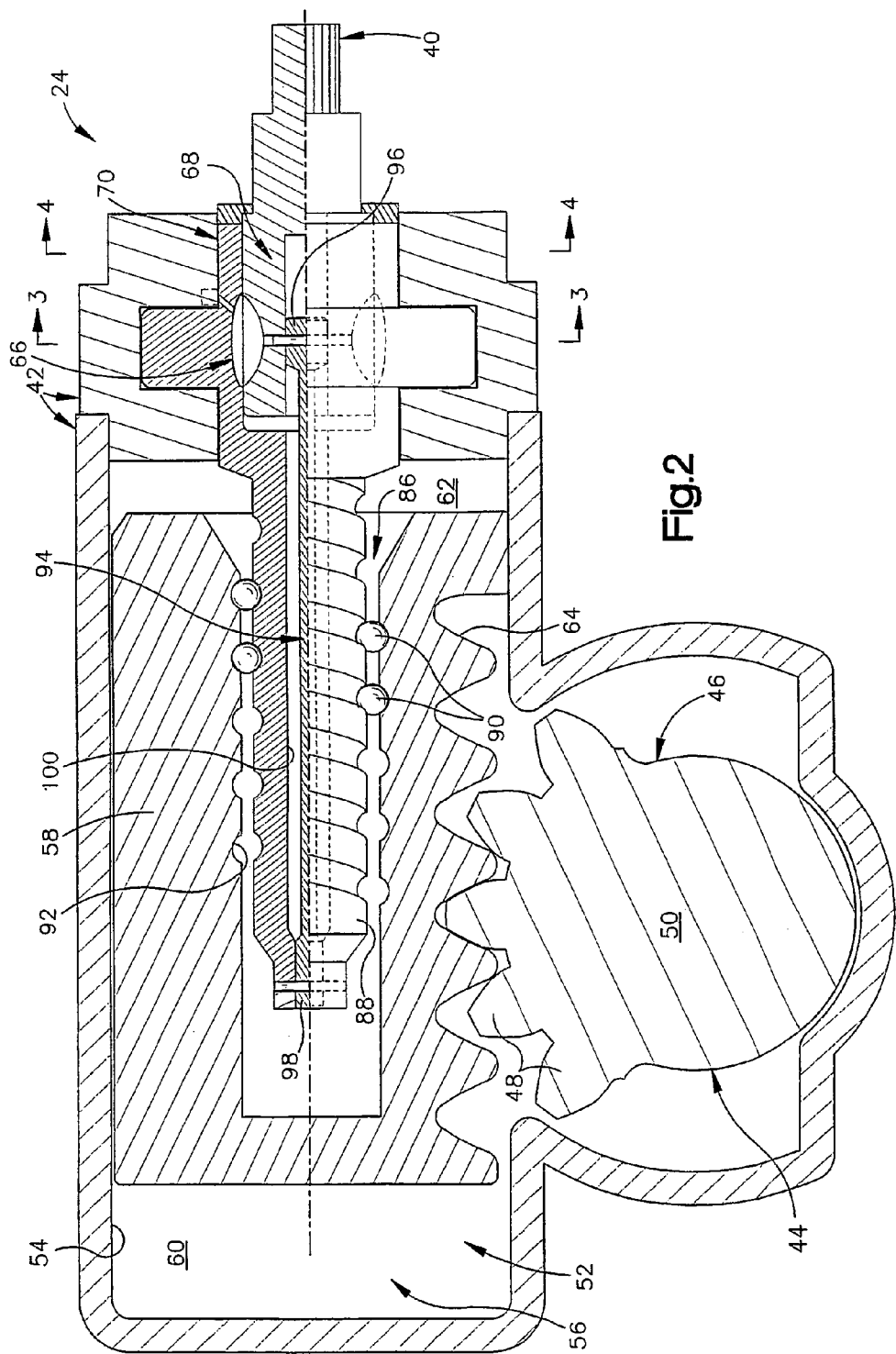
FIG. 2 is a schematic elevation view, partially in section, through an exemplary steering gear of the apparatus of FIG. 1.

The front steering gear 24 may be an integral, hydraulic power steering gear. Alternatively, the front steering gear 24 may be any known hydraulic or electric powered steering gear. FIG. 2 illustrates an exemplary integral, hydraulic power steering gear that may be used as the front steering gear 24.

As shown in FIG. 2, the front steering gear 24 includes a housing 42 and a drive mechanism 44. The drive mechanism 44 is moved in response to rotation of an input shaft 40 of the front steering gear 24. Motion of the drive mechanism 44 results in a turning of the front set of steerable wheels 28 of the vehicle 12.

The drive mechanism 44 includes a sector gear 46 having a plurality of teeth 48. The sector gear 46 is fixed on an output shaft 50 that extends outwardly through an opening in the housing 42 of the front steering gear 24. The output shaft 50 is typically connected to a pitman arm (not shown) that is connected with the front steering axle 26 of the vehicle 12. Thus, as the sector gear 46 rotates, the output shaft 50 is rotated and the front set of steerable wheels 28 of the vehicle 12 is turned.

The front steering gear 24 further includes a hydraulic motor 52 for moving the drive mechanism 44. The hydraulic motor 52 is located within the housing 42 of the front steering gear 24. The housing 42 of the front steering gear 24 has an inner cylindrical surface 54 defining a chamber 56. A piston 58 is located within the chamber 56 and divides the chamber 56 into opposite chamber portions 60 and 62. One chamber portion 60 is located on a first side of the piston 58 and the other chamber portion 62 is located on a second, opposite side of the piston 58. The piston 58 creates a seal between the respective chamber portions 60 and 62 and is capable of axial movement within the chamber 56.

A series of rack teeth 64 is formed on the bottom of the piston 58. The rack teeth 64 act as an output for the hydraulic motor 52 and mesh with the teeth 48 formed on the sector gear 46 of the drive mechanism 44. When the piston 58 moves axially, the rack teeth 64 of the piston 58 interact with the teeth 48 of the sector gear 46 to rotate the sector gear.

A pump (not shown) supplies hydraulic fluid from a reservoir (not shown) to the hydraulic motor 52. Typically, the engine (not shown) of the vehicle drives the pump. However, the pump could be driven otherwise, such as by a dedicated electric motor. The pump forces hydraulic fluid into an inlet (not shown) of the housing 42. The inlet directs the flow of the fluid to a directional control valve 66.

The directional control valve 66 directs the fluid to an appropriate chamber portion 60 or 62 of the hydraulic motor 52. The flow of hydraulic fluid toward one of the chamber portions 60 or 62 increases the pressure within that chamber portion 60 or 62. When the pressure of one chamber portion 60 or 62 increases relative to the pressure of the other chamber portion 60 or 62, the piston 58 moves axially until the pressure within each chamber portion 60 or 62 again equalizes. As the piston 58 moves axially, the volume of one chamber portion 60 or 62 increases and the volume of the other chamber portion 60 or 62 decreases. The decreasing chamber portion 60 or 62 is vented to allow a portion of the fluid contained in the decreasing chamber portion 60 or 62 to escape. The escaping fluid exits the housing 42 via a return (not shown) and is directed into the reservoir.

Figure 3:
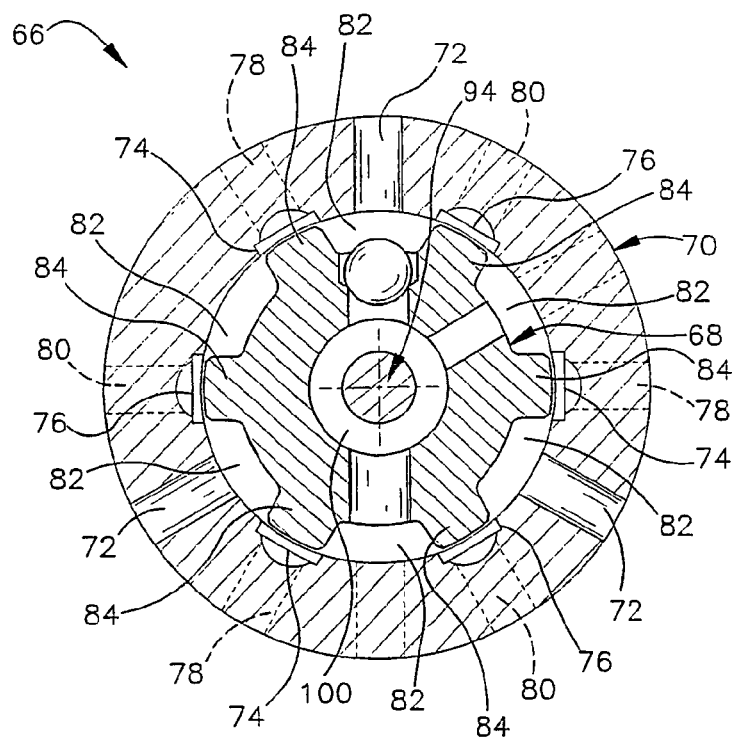
FIG. 3 is a cross-sectional view taken approximately along line 3-3 of FIG. 2.

An exemplary embodiment of the directional control valve 66 is shown in FIG. 3. The directional control valve 66 contains a valve core part 68 and a valve sleeve part 70. A portion of the valve core part 68 is contained within and is rotatable relative to the valve sleeve part 70.

The valve sleeve part 70 includes three radially directed passages 72 that extend from an outer circumference of the valve sleeve part 70 to an inner circumference of the valve sleeve part. Each of the radial passages 72 is supplied with hydraulic fluid that enters the housing 42 through the inlet. Two axially extending grooves 74 and 76 are associated with each radial passage 72. The axially extending grooves 74 and 76 are located on the inner circumference of the valve sleeve part 70. As shown in FIG. 3, one groove 76 is located clockwise from each radial passage 72 and one groove 74 is located counter-clockwise from each radial passage. The grooves 74 and 76 are equidistant from a respective radial passage 72. Each groove 74 leads to a passage 78 extending radially outwardly through the valve sleeve part 70. Each groove 76 leads to a passage 80 extending radially outwardly through the valve sleeve part 70. Each groove 74 and 76 and associated passage 78 and 80 is associated with a particular chamber portion 60 and 62 of the hydraulic motor 52. For example, with reference to FIG. 3, each groove 76 and associated passage 80 located immediately clockwise of a radial passage 72 will supply hydraulic fluid to chamber portion 62; whereas, each groove 74 and associated passage 78 located immediately counter-clockwise from a radial passage 72 will supply hydraulic fluid to chamber portion 60.

Six grooves 82 are located around the outer circumference of the valve core part 68. The valve core part 68 also includes six protrusions 84 or lands. A protrusion 84 separates adjacent grooves 82 on the outer circumference of the valve core part 68. Side walls of the protrusion 84 form side walls of the grooves 82.

When the valve core part 68 is located relative to the valve sleeve part 70 such that each protrusion 84 of the valve core part 68 is centered relative to a respective groove 74 or 76 of the valve sleeve part 70, the directional control valve 66 is in a neutral position. FIG. 3 illustrates the directional control valve 66 in the neutral position. In the neutral position, the pressure within each chamber portion 60 and 62 of the hydraulic motor 52 is the same so that the piston 58 of the hydraulic motor is stationary. When the valve core part 68 is rotated relative to the valve sleeve part 70, access to one of the two grooves 74 or 76 associated with a respective radial passage 72 of the valve sleeve part 70 is restricted by a protrusion 84 of the valve core part 68, while access to the other of the two grooves 74 or 76 is increased or opened. This allows a greater amount of the hydraulic fluid to flow toward the open groove 74 or 76, resulting in an increase in pressure of the chamber portion 60 or 62 associated with that groove 74 or 76. As a result of the increased pressure within the chamber portion 60 or 62 associated with the open groove 74 or 76, the piston 58 of the hydraulic motor 52 is moved. For example, if the valve core part 68 is rotated clockwise as viewed in FIG. 3, fluid flow to the groove 74 of the valve sleeve part 70 located on the counter-clockwise side of the radial passage 72 is restricted and fluid flow to the groove 76 located on the clockwise side of the radial passage 72 is opened or increased. Pressure in the chamber portion 62 of the hydraulic motor 52 associated with groove 76 is increased relative to the pressure in chamber portion 60. As a result, the piston 58 moves to the left, as viewed in FIG. 2, to rotate the sector gear 46 and turn the front set of steerable wheels 28 of the vehicle 12 in the appropriate direction.

The piston 58 of the hydraulic motor 52 includes a bore 86 that is open toward the directional control valve 66. The valve sleeve part 70 and a follow-up member 88 form an integral one-piece unit that is supported for rotation relative to the piston 58 by a plurality of balls 90. The outer periphery of the follow-up member 88 is threaded. The plurality of balls 90 interconnects the threaded outer periphery of the follow-up member 88 with an internal thread 92 formed in the bore 86 of the piston 58. As a result of the interconnecting plurality of balls 90, axial movement of the piston 58 causes the follow-up member 88 and the valve sleeve part 70 to rotate. The rotation of the follow-up member 88 and the valve sleeve part 70 returns the directional control valve 66 to the neutral position.

Figure 4:
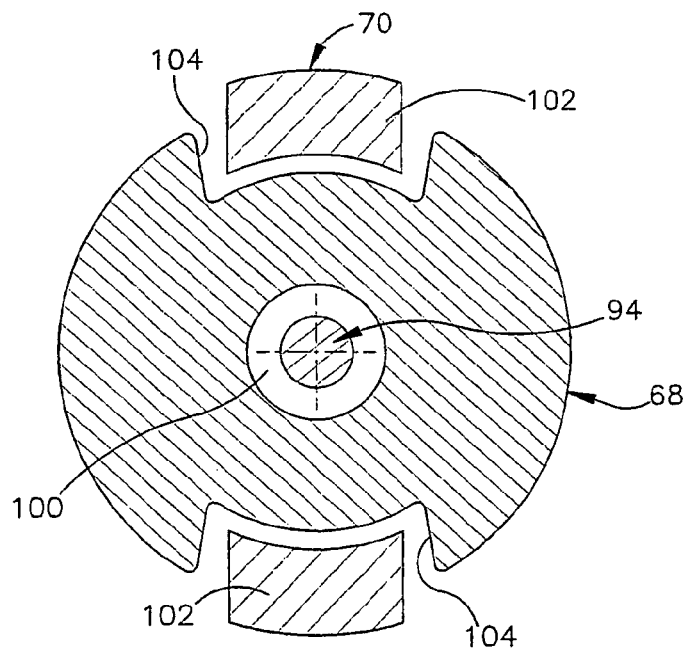
FIG. 4 is a cross-sectional view taken approximately along line 4-4 of FIG. 2.

The valve core part 68 of the directional control valve 66 is fixedly connected to the input shaft 40 (FIG. 2). A first end 96 of a torsion bar 94 is fixed relative to the input shaft 40 and the valve core part 68. A second end 98 of the torsion bar 94 is fixed relative to the valve sleeve part 70 and the follow-up member 88. At least a portion of the torsion bar 94 extends through an axially extending bore 100 in the valve core part 68, as shown in FIGS. 2-4.

When resistance to turning of the front set of steerable wheels 28 of the vehicle 12 is below a predetermined level, rotation of the input shaft 40 of the front steering gear 24 is transferred through the torsion bar 94 and causes rotation of the follow-up member 88. As a result, the directional control valve 66 remains in the neutral position. Rotation of the follow-up member 88 causes movement of the piston 58 and results in turning of the front set of steerable wheels 28.

When resistance to turning the front set of steerable wheels 28 of the vehicle 12 is at or above the predetermined level, rotation of the follow-up member 88 is resisted. As a result, rotation of the input shaft 40 of the front steering gear 24 rotates the first end 96 of the torsion bar 94 relative to the second end 98 of the torsion bar. The rotation of the first end 96 of the torsion bar 94 relative to the second end 98 of the torsion bar applies torsion across the torsion bar 94 and causes the valve core part 68 to rotate relative to the valve sleeve part 70.

As discussed above, when the valve core part 68 rotates relative to the valve sleeve part 70, hydraulic fluid is directed toward one of the chamber portions 60 and 62. As a result, the piston 58 moves within the chamber 56. Movement of the piston 58 results in turning of the front set of steerable wheels 12 of the vehicle 12, as well as, rotation of the follow-up member 88. As discussed above, rotation of the follow-up member 88 rotates the valve sleeve part 70 until the directional control valve 66 is again in the neutral position. When the directional control valve 66 is in the neutral position, the torsion across the torsion bar 94 is removed and the first end 96 of the torsion bar 94 is no longer rotated relative to the second end 98 of the torsion bar.

As shown in FIG. 4, the valve sleeve part 70 also includes first and second lugs 102 that are disposed in diametrically opposed cut-outs 104 in the valve core part 68. Upon rotation of the valve core part 68 of between 20° and 8° relative to the valve sleeve part 70, the lugs 102 of the valve sleeve part 70 engage sidewalls formed by the cut-outs 104 in the valve core part 68 to cause the valve sleeve part 70 to be rotated along with the valve core part 68. Such rotation of the valve sleeve part 70 causes the piston 58 to move within the chamber 56 and, hence, allows for the front set of steerable wheels 28 of the vehicle 12 to be turned by the turning of the input shaft 40 of the front steering gear 24. Thus, even if a loss in hydraulic fluid pressure has occurred, turning the input shaft 40 of the front steering gear 24 enables the turning of the front set of steerable wheels 28 of the vehicle 12.

The steering apparatus 10 also includes an electric motor 110 that is operatively connected to the front steering gear 24. Preferably, an output shaft of the electric motor 110 is connected to the input shaft 40 of the front steering gear 24 through a gear assembly. If the front steering gear 24 is an electric power steering gear, the electric motor 110 may be eliminated, as the electric power steering gear will include a dedicated electric motor.

The controller 22 is also operatively connected to electric motor 110 and controls actuation of electric motor 110. Since the electric motor 110 is operatively connected to the front steering gear 24, actuation of the electric motor 110 results in actuation of the front steering gear 24. Thus, the controller 22 controls actuation of the front steering gear 24 for moving the front steering axle 26 so as to turn the front set of steerable wheels 28. Since the front steering gear 24 and the electric motor 110 are not mechanically connected to the steering wheel 14 and are actuated by the controller 22, the front steering gear 24 and the electric motor 110 collectively form a steer-by-wire steering system.

A steering angle sensor 114 is operable for sensing a steering angle of the front set of steerable wheels 28. In sensing the steering angle of the front set of steerable wheels 28, the steering angle sensor 114 may sense the linear movement of the front steering axle 26 or the rotation of the output shaft 50 of the front steering gear 24. Other methods of sensing the steering angle of the front set of steerable wheels 28 are also contemplated by this invention. In an exemplary embodiment of the invention, the steering angle sensor 114 is a non-contacting position sensor for sensing the rotation of the output shaft 50 of the front steering gear 24. The steering angle sensor 114 provides a signal indicative of the steering angle of the front set of steerable wheels 28 to the controller 22.

The steering apparatus 10 also includes a rear steering gear 120. The rear steering gear 120 is operatively connected to a rear steering axle 122 having a rear set of steerable wheels 124. Although the rear set of steerable wheels 124 is shown in FIG. 1 as including two wheels, the rear set of steerable wheels 124 may, alternatively, include a number of steerable wheels other than two, for example, four steerable wheels. A centering and locking mechanism 125 is operatively connected to the rear steering axle 122. The centering and locking mechanism 125 returns the rear set of steerable wheels 124 to the straight-ahead position and mechanically locks the rear set of steerable wheels 124 in the straight-ahead position when the rear steering gear 120 is not acting on the rear steering axle 122.

The rear steering gear 120 may be an integral, hydraulic power steering gear similar to the front steering gear 24 illustrated in FIG. 2. Actuation of the rear steering gear 120 results in linear movement of the rear steering axle 122 and turning of the rear set of steerable wheels 124. As an alternative to an integral, hydraulic power steering gear, the rear steering gear 120 may be any known hydraulic or electric powered steering gear.

The steering apparatus 10 also includes an electric motor 126 that is operatively connected to the rear steering gear 120. Preferably, an output shaft of the electric motor 126 is connected to an input shaft, similar to input shaft 40 in FIG. 2, of the rear steering gear 120 through a gear assembly. If the rear steering gear 120 is an electric powered steering gear, the electric motor 126 may be eliminated, as the electric power steering gear will include a dedicated electric motor.

The controller 22 is also operatively connected to electric motor 126 and controls actuation of electric motor 126. Since the electric motor 126 is operatively connected to the rear steering gear 120, actuation of the electric motor 126 results in actuation of the rear steering gear 120. Thus, the controller 22 controls actuation of the rear steering gear 120 for moving the rear steering axle 122 so as to turn the rear set of steerable wheels 124. Since the rear steering gear 120 and the electric motor 126 are not mechanically connected to the steering wheel 14 and are actuated by the controller 22, the rear steering gear 120 and the electric motor 126 collectively form a steer-by-wire steering system.

A steering angle sensor 128 is operable for sensing a steering angle of the rear set of steerable wheels 124. In sensing the steering angle of the rear set of steerable wheels 124, the steering angle sensor 128 may sense the linear movement of the rear steering axle 122 or the rotation of an output shaft, similar to output shaft 50 in FIG. 2, of the rear steering gear 120. Other methods of sensing the steering angle of the rear set of steerable wheels 124 are also contemplated by this invention. In an exemplary embodiment of the invention, the steering angle sensor 128 is a non-contacting position sensor for sensing the rotation of the output shaft of the rear steering gear 120. The steering angle sensor 128 provides a signal indicative of the steering angle of the rear set of steerable wheels 124 to the controller 22.

A vehicle speed sensor 130 is also operatively connected to the controller 22. The vehicle speed sensor 130 monitors the vehicle speed and provides the controller with speed signals indicative of the vehicle speed.

The controller 22 is also operatively connected to an indicator 132. The indicator 132 is responsive to alert signals from the controller 22 to provide an indication to the vehicle operator. The indication provided by the indicator 132 may include any one or any combination of audio, visual, and tactile signals.

Figure 5A:
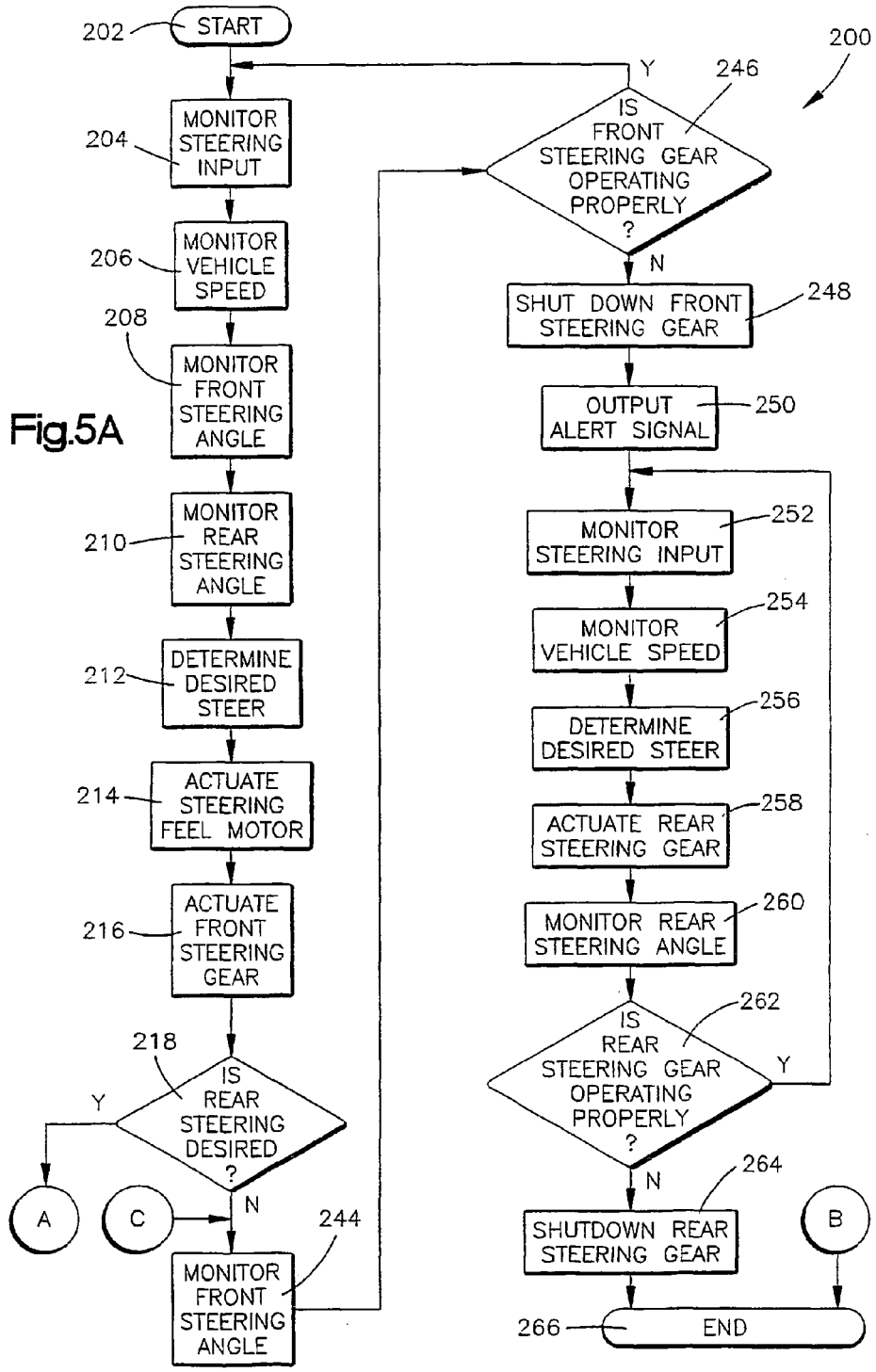
FIGS. 5A and 5B illustrate a flow diagram of an exemplary control process performed by a controller of the apparatus of FIG. 1.
Figure 5B:
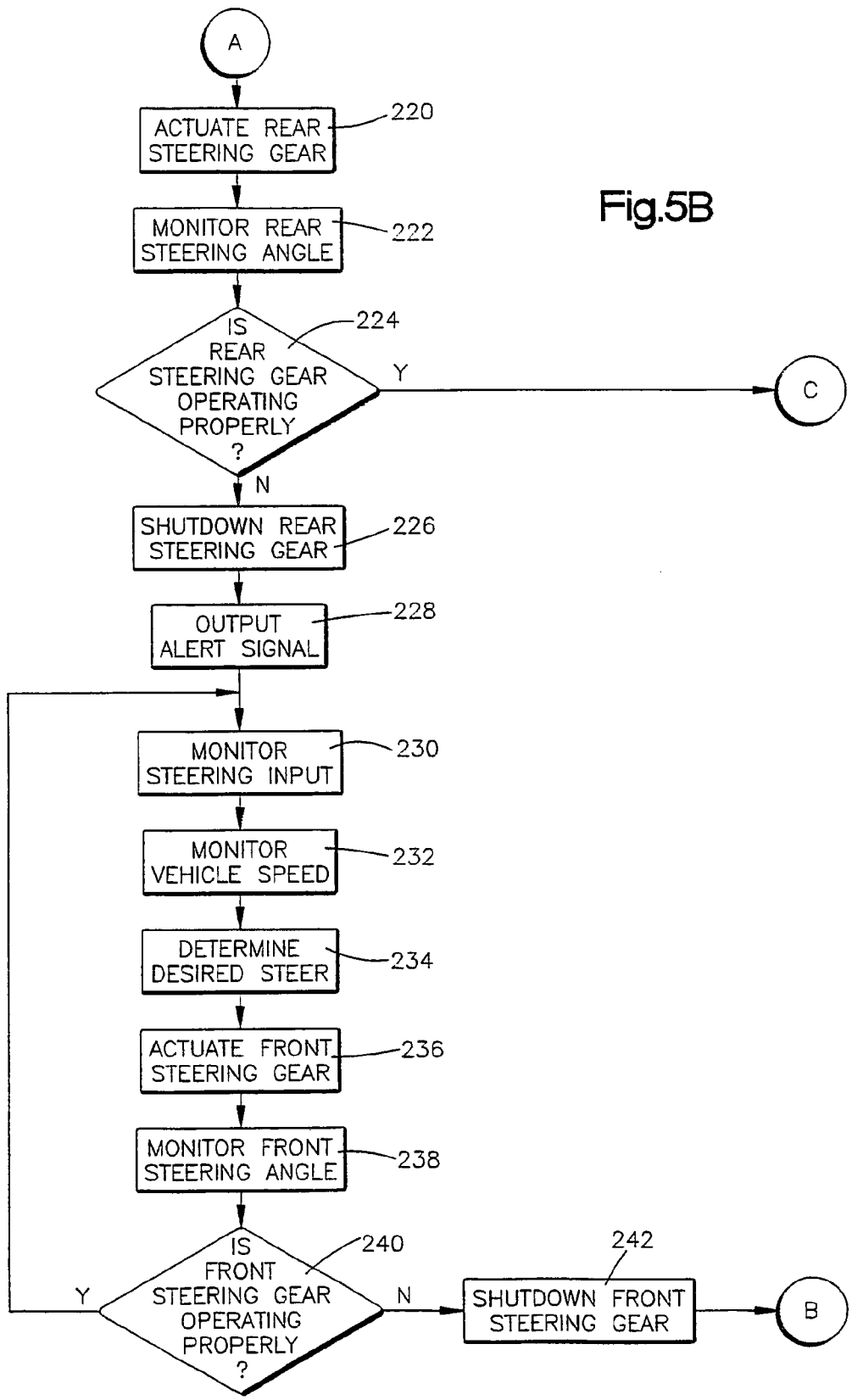

FIGS. 5A and 5B is a flow diagram of an exemplary control process 200 performed by the controller 22 of the steering apparatus 10 of the present invention. The control process 200 starts at step 202 in which the controller 22 is reset into its initial condition. In an exemplary embodiment of the invention, step 202 occurs in response to closure of an ignition switch (not shown) of the vehicle 12. If the ignition switch of the vehicle 12 is opened during operation of the control process 200, the control process 200 restarts at step 202 when the ignition switch is again closed.

At step 204, the controller 22 monitors the torque/position sensor 18 to determine the operator applied steering input into the steering wheel 14. At step 206, the controller 22 monitors the vehicle speed sensor 130 to determine the speed of the vehicle 12. At steps 208 and 210, the controller monitors steering angle sensors 114 and 128, respectively, to determine the steering angles of the front and rear sets of steerable wheels 28 and 124, respectively.

At step 212, the controller 22 performs a known algorithm to determine a desired vehicle steer. In performing the known algorithm, the controller 22 is responsive to the steering input from step 204, the vehicle speed from step 206, and the current steering angles of the front and rear sets of steerable wheels 28 and 124 from steps 208 and 210.

At step 214, the controller 22 actuates electric motor 20 for providing a steering feel to the steering wheel 14. At step 216, the controller 22 actuates the front steering gear 24 for turning the front set of steerable wheels 28. To actuate the front steering gear 24, the controller 22 actuates electric motor 110, which in turn, actuates the front steering gear 24. The front steering gear 24 provides the primary steering operation for the vehicle 12. The control process 200 proceeds from step 216 to step 218. At step 218, the controller 22 determines if rear steering is desired. If rear steering is desired, the control process 200 proceeds to step 220.

At step 220, the rear steering gear 120 is actuated for turning the rear set of steerable wheels 124. In this exemplary embodiment of the invention, the rear steering gear 120 provides supplementary steering operation for the vehicle 12. To actuate the rear steering gear 120, the controller 22 actuates electric motor 126, which in turn, actuates the rear steering gear 120.

Figure 6A:
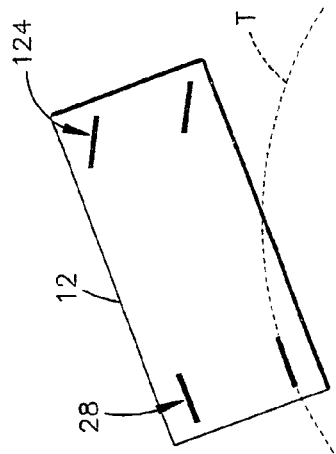
FIGS. 6a-c schematically illustrate vehicle steering with the apparatus of FIG. 1 in various operating conditions.

FIG. 6a schematically illustrates the vehicle 12 being turned in response to actuation of the front and rear steering gears 24 and 120, respectively. The dashed arc T in FIG. 6a illustrates the trajectory of the vehicle 12. As FIG. 6a illustrates, the front set of steerable wheels 28 turn in an opposite direction as the rear set of steerable wheels 124 for moving the vehicle along the trajectory T.

After the rear steering gear 120 is actuated, the controller 22, at step 222, monitors the steering angle sensor 128 to determine the steering angle of the rear set of steerable wheels 124. At step 224, the controller 22 compares the steering angle of the rear set of steerable wheels 124 from step 222 to the desired rear steering angle determined at step 212 to determine if the rear steering gear 120, upon being actuated, operated properly. A malfunction of either of the electric motor 126 or the rear steering gear 120 may result in the steering angle of the rear set of steerable wheels 124 not moving to the desired steering angle in response to actuation of the rear steering gear 120 at step 220. If the controller 22 determines at step 224 that the rear steering gear is operating properly, the control process 200 proceeds to step 244. If the controller 22 determines at step 224 that the rear steering gear is malfunctioning, the control process 200 proceeds to step 226.

In response to determining that the rear steering gear 120 is malfunctioning, at step 226, the controller shuts down or ceases actuation of the rear steering gear 120. When the rear steering gear 120 is shutdown, the centering and locking mechanism 125 causes the rear set of steerable wheels 124 to return to the straight-ahead position and become locked in the straight-ahead position. At step 228, the controller 22 outputs an alert signal to the indicator 132. In response to the alert signal, the indicator 132 provides an indication to the vehicle operator that service to the steering apparatus 10 is necessary.

The controller 22, at step 230, again monitors the torque/position sensor 18 to determine the operator applied steering input into the steering wheel 14. At step 232, the controller 22 monitors the vehicle speed sensor 130 to determine the speed of the vehicle 12. At step 234, the controller 22 performs a known algorithm to determine a desired vehicle steer. The known algorithm at step 234 is an algorithm for determining the desired vehicle steering using only the front steering gear 24. At step 236, the controller 22 actuates the front steering gear 24 to carry out the desired steer determined at step 234 and there is no steering with the rear set of steerable wheels 124.

Figure 6B:
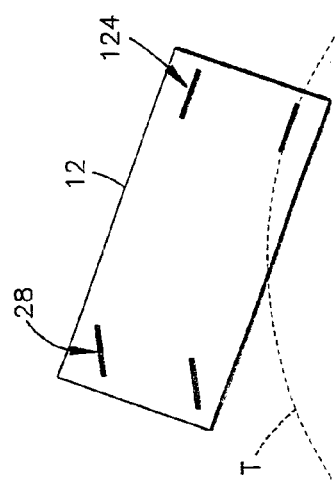

FIG. 6b schematically illustrates the vehicle 12 being turned in response to actuation of only the front steering gear 24. The dashed arc T in FIG. 6b illustrates the trajectory of the vehicle 12. A comparison of FIG. 6a and FIG. 6b illustrates that the front set of steerable wheels 28 must turn at a greater angle to follow the trajectory T when the front set of steerable wheels 28 are being turned and the rear set of steerable wheels 124 are locked in the straight-ahead position.

After the front steering gear 24 is actuated, the controller 22, at step 238, monitors the steering angle sensor 114 to determine the steering angle of the front set of steerable wheels 28. At step 240, the controller 22 compares the steering angle of the front set of steerable wheels 28 from step 238 to the desired steering angle determined at step 234 to determine if the front steering gear, upon actuation, operated properly. A malfunction of either of the electric motor 110 or the front steering gear 24 may result in the steering angle of the front set of steerable wheels 28 not moving to the desired steering angle in response to actuation of the front steering gear 24 at step 236. If the controller 22 determines at step 240 that the front steering gear 24 is operating properly, the control process 200 returns to step 230 and steering of the vehicle 12 using only the front steering gear 24 continues. If the controller 22 determines at step 240 that the front steering gear 24 is malfunctioning, the control process 200 proceeds to step 242 and shuts down the front steering gear 24. From step 242, the control process proceeds to step 266 and ends.

If at step 218, the controller 22 determines that rear steering is not desired, the control process 200 proceeds to step 244. At step 244, the controller 22 monitors the steering angle sensor 114 to determine the steering angle of the front set of steerable wheels 28. At step 246, the controller 22 compares the steering angle of the front set of steerable wheels 28 from step 244 to the desired steering angle determined at step 212 to determine if the front steering gear 24, upon actuation, operated properly. If the controller 22 determines at step 246 that the front steering gear 24 is operating properly, the control process 200 returns to step 204 and steering of the vehicle 12 using both the front and rear steering gears 24 and 120 continues. If the controller 22 determines at step 246 that the front steering gear 24 is malfunctioning, the control process 200 proceeds to step 248 and shuts down the front steering gear 24. When the front steering gear 24 is shutdown, the centering and locking mechanism 30 causes the front set of steerable wheels 28 to return to the straight-ahead position and become locked in the straight-ahead position. At step 250, the controller 22 outputs an alert signal to the indicator 132. In response to the alert signal, the indicator 132 provides an indication to the vehicle operator that service to the steering apparatus 10 is necessary.

The controller 22, at step 252, again monitors the torque/position sensor 18 to determine the operator applied steering input into the steering wheel 14. At step 254, the controller 22 monitors the vehicle speed sensor 130 to determine the speed of the vehicle 12. At step 256, the controller 22 performs an algorithm to determine a desired vehicle steer. The algorithm used at step 256 is an algorithm for determining the desired vehicle steering using only the rear steering gear 120. At step 258, the controller 22 actuates the rear steering gear 120 to carry out the desired steer determined at step 256 and there is no steering with the front set of steerable wheels 28.

Figure 6C:
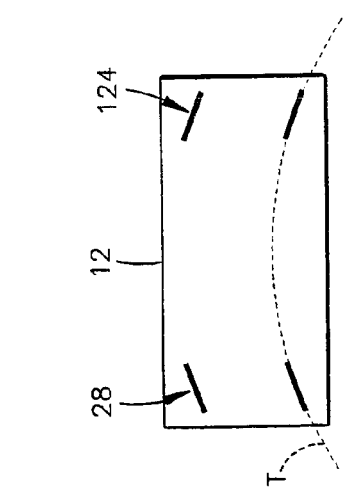

FIG. 6c schematically illustrates the vehicle 12 being turned in response to actuation of only the rear steering gear 120. The dashed arc T in FIG. 6c illustrates the trajectory of the vehicle 12. A comparison of FIG. 6a and FIG. 6c illustrates that the rear set of steerable wheels 124 must turn at a greater angle to follow the trajectory T when the rear set of steerable wheels 124 are being turned and the front set of steerable wheels 28 are locked in the straight-ahead position. A comparison of FIG. 6b and FIG. 6c illustrates that the rear set of steerable wheels 124 in FIG. 6c must be turned in a direction opposite to the front set of steerable wheels 28 in FIG. 6b to follow the trajectory T.

After the rear steering gear 120 is actuated, the controller 22, at step 260, monitors the steering angle sensor 128 to determine the steering angle of the rear set of steerable wheels 124. At step 262, the controller 22 compares the steering angle of the rear set of steerable wheels 124 from step 260 to the desired steering angle determined at step 256 to determine if the rear steering gear 120, upon actuation, operated properly. If the controller 22 determines at step 262 that the rear steering gear 120 is operating properly, the control process 200 returns to step 252 and steering of the vehicle 12 using only the rear steering gear 120 continues. If the controller 22 determines at step 262 that the rear steering gear 120 is malfunctioning, the control process 200 proceeds to step 264 and shuts down the rear steering gear 120. From step 264, the control process 200 proceeds to step 266 and ends.

Alternative control processes are also contemplated by this invention. For example, the rear steering gear 120 may remain idle and may be used only as a backup or fail-safe steering gear for use in response to a malfunction of the front steering gear 24.

The steering apparatus 10 of FIG. 1 also includes a differential acceleration and braking control 140. The differential acceleration and braking control 140 is operatively connected to the controller 22 and to the front and rear sets of steerable wheels 28 and 124. The differential acceleration and braking control 140, when actuated, enables the acceleration or braking of wheels located on the right side of the vehicle 12 to be controlled separately and independently from the acceleration and braking of the wheels located on the left side of the vehicle 12. Thus, in the event of a malfunction of both the front and rear steering gears 24 and 120, respectively, the differential acceleration and braking control 140 may be actuated to enable the vehicle 12 to be safety steered to a stop.

Figure 7:
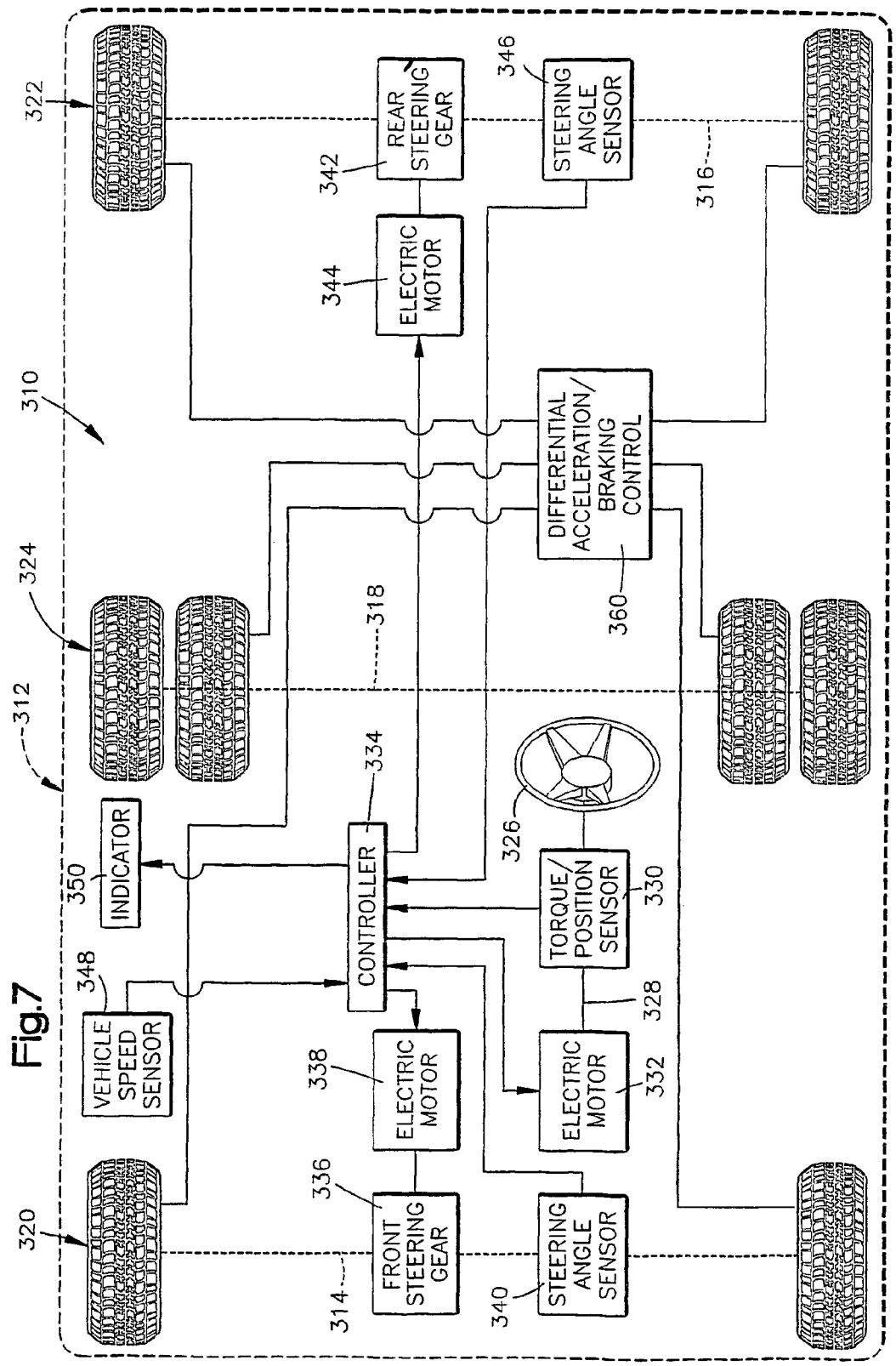
FIG. 7 is a schematic illustration of an apparatus constructed in accordance with a second embodiment of the present invention.

FIG. 7 is a schematic illustration of a steering apparatus 310 constructed in accordance with a second embodiment of the present invention. The steering apparatus 310 is mounted in a vehicle, illustrated schematically at 312, having three axles. The vehicle 312 may optionally include more than three axles. The three axles of the vehicle 312 illustrated in FIG. 7 include a front steering axle 314, a rear steering axle 316, and a central drive axle 318.

A front set of steerable wheels 320 is attached to the front steering axle 314. Linear movement of the front steering axle 314 results in turning of the front set of steerable wheels 320. The front set of steerable wheels 320 is mounted on the vehicle 312 with a positive caster. As a result of the positive caster, the front set of steerable wheels 320 tends to track the trajectory of the vehicle 312 when not being steered. Thus, when the vehicle 312 is traveling in a straight path, the front set of steerable wheels 320 returns to a straight-ahead position. When the vehicle 312 is turning, the front set of steerable wheels 320 move from the straight-ahead position to a position perpendicular to the turning radius of the vehicle.

A rear set of steerable wheels 322 is attached to the rear steering axle 316. Linear movement of the rear steering axle 316 results in turning of the rear set of steerable wheels 322. The rear set of steerable wheels 322 is mounted on the vehicle 312 with a positive caster. As a result of the positive caster, the rear set of steerable wheels 28 tends to track the trajectory of the vehicle 312 when not being steered.

A set of drive wheels 324 is attached to the drive axle 318. Forces are transferred from the drive axle 318 to the drive wheels 324 to cause the vehicle 312 to move in either a forward or rearward direction. In the exemplary embodiment illustrated in FIG. 7, the drive axle 318 is located equidistance from the front and rear steering axles 314 and 316. Equidistant spacing of the axles 314, 316, and 318 enhances the load carrying capability of the vehicle 312 and decreases road damaged caused by the vehicle. Alternatively, the drive axle 318 and the rear steering axle 316 may be placed close together in tandem.

The steering apparatus 310 of FIG. 7 includes a vehicle steering wheel 326 or other driver control interface. The steering wheel 326 is of a known construction and is manually rotatable by a vehicle operator. A shaft 328 is fixed to the center or hub of the steering wheel 326. Angular rotation of the steering wheel 326 results in an equivalent angular rotation of the shaft 328. A torque/position sensor 330 is operable to sense operator applied torque and angular rotation of the steering wheel 326 and to provide steering input signals indicative of the applied torque and angular rotation of the steering wheel.

An electric motor 332 is connected to the shaft 328. Preferably, a gear assembly (not shown) connects an output shaft of the electric motor 332 to the shaft 328. The electric motor 332 is actuatable to provide resistance to rotation of the steering wheel 326 and thus, is commonly referred to as a "steering feel motor."

The steering apparatus 310 also includes a controller 334. Preferably, the controller 334 is a microcomputer. The controller 334 is operatively coupled to the torque/position sensor 330 and receives the steering input signals from the torque/position sensor 330. The controller 334 is also operatively connected to the electric motor 332. The controller 334 is responsive to the steering input signals from the torque/position sensor 330 for controlling actuation of electric motor 332 for providing steering feel to the steering wheel 326.

The steering apparatus 310 also includes a front steering gear 336. The front steering gear 336 is operatively connected to the front steering axle 314. The front steering gear 336 is actuatable for moving the front steering axle 314 so as to turn the front set of steerable wheels 320. The front steering gear 336 may be an integral, hydraulic power steering gear, similar to the front steering gear 24 illustrated in FIG. 2. Alternatively, the front steering gear 336 may be any known hydraulic or electric powered steering gear.

The steering apparatus 310 also includes an electric motor 338 that is operatively connected to the front steering gear 336. Preferably, an output shaft of the electric motor 338 is connected to an input shaft, similar to input shaft 40 in FIG. 2, of the front steering gear 336 through a gear assembly. If the front steering gear 336 is an electric powered steering gear, the electric motor 338 may be eliminated, as the electric power steering gear will include a dedicated electric motor.

The controller 334 is also operatively connected to electric motor 338 and controls actuation of electric motor 338. Since the electric motor 338 is operatively connected to the front steering gear 336, actuation of the electric motor 338 results in actuation of the front steering gear 336. Thus, the controller 334 controls actuation of the front steering gear 336 for moving the front steering axle 314 so as to turn the front set of steerable wheels 320. Since the front steering gear 336 and the electric motor 338 are not mechanically connected to the steering wheel 326 and are actuated by the controller 334, the front steering gear 336 and the electric motor 338 collectively form a steer-by-wire steering system.

A steering angle sensor 340 is operable for sensing a steering angle of the front set of steerable wheels 320. In sensing the steering angle of the front set of steerable wheels 320, the steering angle sensor 340 may sense the linear movement of the front steering axle 314 or the rotation of an output shaft, similar to output shaft 50 in FIG. 2, of the front steering gear 336. Other methods of sensing the steering angle of the front set of steerable wheels 320 are also contemplated by this invention.

The steering apparatus 310 also includes a rear steering gear 342. The rear steering gear 342 is operatively connected to the rear steering axle 316. The rear steering gear 342 is actuatable for moving the rear steering axle 316 so as to turn the rear set of steerable wheels 322. The rear steering gear 342 may be an integral, hydraulic power steering gear similar to the front steering gear 336. Alternatively, the rear steering gear 342 may be any known hydraulic or electric powered steering gear.

An electric motor 344 is operatively connected to the rear steering gear 342. Preferably, an output shaft of the electric motor 344 is connected to an input shaft of the rear steering gear 342 through a gear assembly. If the rear steering gear 342 is an electric powered steering gear, the electric motor 344 may be eliminated, as the electric power steering gear will include a dedicated electric motor.

The controller 334 is also operatively connected to electric motor 344 and controls actuation of electric motor 344. Since the electric motor 344 is operatively connected to the rear steering gear 342, actuation of the electric motor 344 results in actuation of the rear steering gear 342. Thus, the controller 334 controls actuation of the rear steering gear 342 for moving the rear steering axle 316 so as to turn the rear set of steerable wheels 322. Since the rear steering gear 342 and the electric motor 344 are not mechanically connected to the steering wheel 326 and are actuated by the controller 334, the rear steering gear 342 and the electric motor 344 collectively form a steer-by-wire steering system.

A steering angle sensor 346 is operable for sensing a steering angle of the rear set of steerable wheels 322. In sensing the steering angle of the rear set of steerable wheels 322, the steering angle sensor 346 may sense the linear movement of the rear steering axle 316 or the rotation of an output shaft of the rear steering gear 342. Other methods of sensing the steering angle of the rear set of steerable wheels 322 are also contemplated by this invention.

A vehicle speed sensor 348 is also operatively connected to the controller 334. The vehicle speed sensor 348 monitors the vehicle speed and provides the controller 334 with speed signals indicative of the vehicle speed.

The controller 334 is also operatively connected to an indicator 350. The indicator 350 is responsive to alert signals from the controller 334 to provide an indication to the vehicle operator. The indication provided by the indicator 350 may any one or any combination of audio, visual, and tactile signals.

The steering apparatus 310 operates in a manner similar to steering apparatus 10 of FIG. 1. Preferably, the controller 334 performs a control process similar to the control process 200. During normal operation of the steering apparatus 310, the front steering gear 336 acts as a primary steering gear and the rear steering gear 342 provides supplemental steering for the vehicle 312. If the controller 334 determines that the rear steering gear 342 is not operating properly, the rear steering gear 342 is shutdown, the indicator 350 is actuated, and the front steering gear 336 is operated to provide all of the steering operation for the vehicle 312. If the controller 334 determines that the front steering gear 336 is not operating properly, the front steering gear 336 is shutdown, the indicator 350 is actuated, and the rear steering gear 342 is operated to provide all of the steering operation for the vehicle 312.

The steering apparatus 310 of FIG. 1 also includes a differential acceleration and braking control 360. The differential acceleration and braking control 360 is operatively connected to the controller 334 and to the front and rear sets of steerable wheels 320 and 322 and the set of drive wheels 324. The differential acceleration and braking control 360, when actuated, enables the acceleration or braking of wheels located on the right side of the vehicle 312 to be controlled separately from the acceleration and braking of the vehicle wheels located on the left side of the vehicle 312. Thus, in the event of a malfunction of both the front and rear steering gears 336 and 342, respectively, the differential acceleration and braking control 360 may be actuated to enable the vehicle 312 to be safety steered to a stop.

Figure 8A:
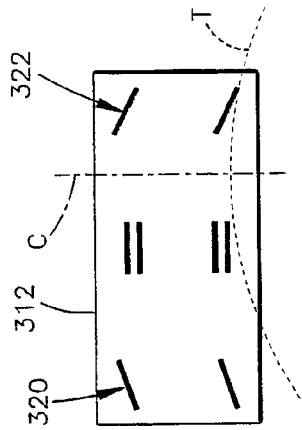
FIG. 8a-c schematically illustrate vehicle steering with the apparatus of FIG. 7 in various conditions.

FIG. 8a schematically illustrates the vehicle 312 being turned in response to actuation of the front and rear steering gears 336 and 342, respectively. The dashed arc T in FIG. 8a illustrates the trajectory of the vehicle 312 and the vertical line C illustrates the turning center of the vehicle 312. During a turn, the vehicle 312 pivots about a point that is located on the turning center C of the vehicle 312. As FIG. 8a illustrates, the front set of steerable wheels 320 turn in a direction opposite to the rear set of steerable wheels 322 when the vehicle follows trajectory T.

Figure 8B:
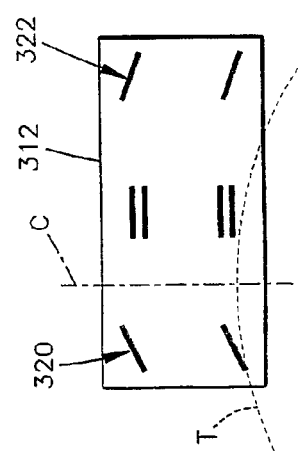

FIG. 8b schematically illustrates the vehicle 312 being turned in response to actuation of only the front steering gear 336. The dashed arc T in FIG. 8b illustrates the trajectory of the vehicle 312 and is identical to the trajectory T shown in FIG. 8a. A comparison of FIG. 8a and FIG. 8b illustrates that the turning center C of the vehicle 312 moves forward, i.e., closer to the front set of steerable wheels 320, when actuating only the front steering gear 336 to turn the front set of steerable wheels 320 to follow the trajectory T. FIG. 8b also illustrates that the caster of the rear set of steerable wheels 322 causes the rear set of steerable wheels to turn to follow the trajectory T of the vehicle 312.

Figure 8C:
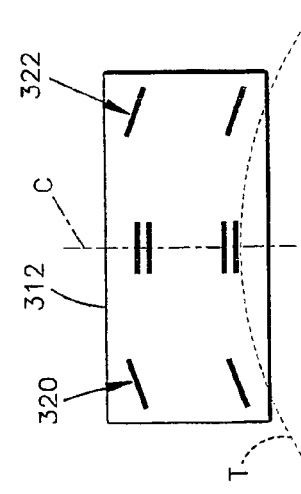

FIG. 8c schematically illustrates the vehicle 312 being turned in response to actuation of only the rear steering gear 342. The dashed arc T in FIG. 8c illustrates the trajectory of the vehicle 312 and is identical to the trajectory T shown in FIGS. 8a and 8b. A comparison of FIG. 8a and FIG. 8c illustrates that the turning center C of the vehicle 312 moves rearward, i.e., closer to the rear set of steerable wheels 322, when actuating only the rear steering gear 342 to turn the rear set of steerable wheels 322 to follow the trajectory T. FIG. 8c also illustrates that the caster of the front set of steerable wheels 320 causes the front set of steerable wheels to turn to follow the trajectory T of the vehicle 312.

From the above description of the invention, those skilled in the art will perceive improvements, changes and modifications. For example, the electric motors may include current sensors monitoring motor current. The controller may also monitor the current sensors for determining if the front and rear steering gears are operating properly. Such improvements, changes and modifications within the skill of the art are intended to be covered by the appended claims.

Having described the invention, I claim the following:

1. An apparatus comprising:
    a driver control interface for turning steerable wheels of a vehicle;
    at least three spaced apart axles including front and rear steering axles and an intermediate axle;
    a sensor for monitoring steering input to the driver control interface and for providing a steering input signal indicative thereof;
    a front steering system operatively connected to the front steering axle and actuatable for turning a front set of steerable wheels;
    a rear steering system operatively connected to the rear steering axle and actuatable for turning a rear set of steerable wheels; and
    a controller responsive to the steering input signal for actuating the front and rear steering systems, the controller, upon a malfunction of one steering system, actuating the other steering system in response to the steering input signal, the malfunctioning steering system moving to a position corresponding to a direction of vehicle travel when the vehicle is turning.

2. The apparatus of claim 1 further including a first feedback sensor for monitoring operation of the front steering system and for providing first feedback signals indicative thereof, a second feedback sensor for monitoring operation of the rear steering system and for providing second feedback signals indicative thereof, the controller, in response to one of the first and second feedback signals indicating a malfunctioning steering system, shutting down the malfunctioning steering system.

3. The apparatus of claim 2 wherein the controller shuts down both the front steering system and the rear steering system in response to both the first and second feedback signals indicating malfunctioning steering systems.

4. The apparatus of claim 2 wherein the first feedback sensor is a steering angle sensor for measuring a steering angle of the front set of steerable wheels, the controller determining that the front steering system is malfunctioning when the first feedback signal indicates a steering angle that differs from a desired steering angle for the front set of steerable wheels.

5. The apparatus of claim 4 wherein the second feedback sensor is a steering angle sensor for measuring a steering angle of the rear set of steerable wheels, the controller determining that the rear steering system is malfunctioning when the second feedback signal indicates a steering angle that differs from a desired steering angle for the rear set of steerable wheels.

6. The apparatus of claim 1 wherein the front steering system is a steer-by-wire steering system and the front set of steerable wheels return to a position corresponding to a direction of vehicle travel when the front steering system is shut down and the vehicle is turning.

7. The apparatus of claim 6 wherein the rear steering system is a steer-by-wire steering system and the rear set of steerable wheels return to a position corresponding to a direction of vehicle travel when the rear steering system is shut down and the vehicle is turning.

8. The apparatus of claim 6, wherein the front steering system moves when the front steering system is shut down and the rear steering system is actuated to turn the rear set of steerable wheels.

9. The apparatus of claim 1 further including an indicator that is actuatable to indicate to a vehicle operator that a malfunction has been detected, the controller, in response to one of the first and second feedback signals indicating a malfunctioning steering system, actuating the indicator.

10. The apparatus of claim 1 wherein the intermediate axle is a drive axle, the drive axle being adapted for transferring forces to a set of drive wheels of the vehicle.

11. The apparatus of claim 10 wherein the drive axle is located equidistance between the front and rear steering axles.

12. The apparatus of claim 1, wherein the malfunctioning steering system moves when the malfunctioning steering system is shut down and the other steering system is actuated to turn one of the rear and front sets of steerable wheels.

13. The apparatus of claim 1 wherein the front steerable wheels are mounted on the vehicle with a positive caster.

14. The apparatus of claim 13 wherein the rear steerable wheels are mounter on the vehicle with a positive caster.

* * * * *